United States Patent
Moshe et al.

(10) Patent No.: US 12,461,866 B2
(45) Date of Patent: Nov. 4, 2025

(54) USING CONTROL BUS COMMUNICATION TO ACCELERATE LINK NEGOTIATION

(71) Applicant: Western Digital Technologies, Inc., San Jose, CA (US)

(72) Inventors: Eran Moshe, Kfar Saba (IL); Shuli Shmaya, Kfar Saba (IL); Barrett Edwards, Monument, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/354,168

(22) Filed: Jul. 18, 2023

(65) Prior Publication Data

US 2024/0143518 A1 May 2, 2024

Related U.S. Application Data

(60) Provisional application No. 63/380,973, filed on Oct. 26, 2022.

(51) Int. Cl.
*G06F 13/12* (2006.01)
(52) U.S. Cl.
CPC ...... *G06F 13/12* (2013.01); *G06F 2213/0024* (2013.01)
(58) Field of Classification Search
CPC .......................... G06F 13/382; G06F 13/4291
See application file for complete search history.

(56) References Cited

U.S. PATENT DOCUMENTS

| | | | |
|---|---|---|---|
| 10,120,823 B2 | 11/2018 | Waidhofer et al. | |
| 11,301,411 B2 | 4/2022 | Harriman | |
| 2008/0140898 A1* | 6/2008 | Bacom | G06F 13/385 710/300 |
| 2009/0313359 A1* | 12/2009 | Yeap | H04W 76/19 709/224 |
| 2017/0212579 A1* | 7/2017 | Tirumala | G06F 13/4291 |
| 2017/0286328 A1* | 10/2017 | Grosse-Puppendahl | G06F 13/382 |
| 2021/0049113 A1* | 2/2021 | Typrowicz | G06F 11/0793 |
| 2022/0164139 A1* | 5/2022 | Moshe | G06F 3/0688 |

FOREIGN PATENT DOCUMENTS

CN 111274183 A 6/2020

* cited by examiner

*Primary Examiner* — Getente A Yimer
(74) *Attorney, Agent, or Firm* — Patent Law Works LLP

(57) ABSTRACT

Systems and methods for devices connected by a control bus to share configuration data for accelerating physical link negotiation for a peripheral interface are described. Computer devices, such as data storage devices, may include a peripheral interface configured to connect to a host system and a control bus interface to connect to a control bus. Other devices on the same control bus may establish peer communication through the control bus interface to share configuration data, such as coefficients for physical link negotiation of the peripheral interface. To accelerate reestablishing communication through the peripheral interface, the device may receive previously stored configuration data from another device over the control bus.

20 Claims, 7 Drawing Sheets

USING CONTROL BUS COMMUNICATION TO ACCELERATE LINK NEGOTIATION

TECHNICAL FIELD

The present disclosure generally relates to computing system devices interconnected through a low-bandwidth bus and, more particularly, to using communication through a low-bandwidth control bus to accelerate physical link negotiation for a peripheral interface.

BACKGROUND

Some computing systems, such as storage arrays, may include multiple storage devices supporting one or more host systems through a peripheral or storage interface bus, such as peripheral component interconnect express (PCIe), serial advanced technology attachment (SATA), or serial attached [small computer serial interface (SCSI)] (SAS). These interfaces may be configured for high-bandwidth transfer rates, such as 3 gigabits (Gb)/second (s), 6 Gb/s, 8 Gb/s, 12 Gb/s, 16 Gb/s, etc., to enable fast and reliable data transfer to and from storage devices, with some versions supporting as high as 512 Gb/s.

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Each storage device in a multi-device storage system may be connected to a host system through at least one high-bandwidth interface, such as PCIe, using an appropriate storage protocol for the storage device, such as non-volatile memory express (NVMe) for accessing solid state drives (SSDs) or the storage blades of all flash arrays. Some multi-device storage systems employ storage devices capable of communicating with one another and/or host systems over the interconnecting fabric and/or network fabric through the high-bandwidth interface. Such fabric-based distributed storage systems may include storage devices configured with direct memory access to enable more efficient transfer of data to and from hosts and other systems.

In some configurations, each storage device may also include another interface that is configured for power management and/or low-bandwidth communication with computing devices sharing the same utility or control bus. For example, storage devices may include a control bus interface that complies with inter-integrated circuit (I2C), improved inter-integrated circuit (I3C), system management bus (SMBus), or similar low-bandwidth control bus protocols. These command buses may interconnect the storage devices within a multi-device storage system and provide a synchronous, multi-master, packet switched, serial communication bus. In some computing systems, control bus pins may be included as part of the physical peripheral interface connector. So, for example, a PCIe physical interface connector may include a set of I2C, I3C, or SMBus pins at one end of the connector for providing the low-bandwidth control interface. For comparison to the high-bandwidth peripheral interfaces used for data transfer, these low-bandwidth control bus interfaces may support ~3-30 megabits (Mb)/s and may operate as low as 100 kilobits (kb)/s.

In some systems, the low-bandwidth control bus may be initialized for communication early in the boot cycle of the storage devices to assist with power management, discovery, and access to external resources, such as temperature sensors, fan controllers, light emitting diode (LED) indicators, etc. Storage devices may have access to the control bus before host communication or control is established through the high-bandwidth peripheral bus.

In order to reestablish communication over the high-bandwidth peripheral bus, configuration parameters for physical link connection that support higher-level communication may need to be negotiated. Negotiating physical link connections each time a device cold boots, reboots, changes power modes, and/or experiences a link error takes time and slows the performance of the multi-device storage system.

Accelerating negotiation of physical link parameters for reestablishing communication over the high-bandwidth peripheral bus may be advantageous. An efficient and reliable way of backing up link configuration data to other connected devices and recalling that configuration data to accelerate link negotiation may be needed.

SUMMARY

Various aspects for using control bus communication to accelerate link negotiation, particularly messaging among connected devices over a low-bandwidth control bus to share configuration data, such as sets of gain and filter coefficient values, for their peripheral interfaces are described.

One general aspect includes a system including a first device that includes: a peripheral interface configured to connect to a host system using a peripheral interface protocol; a control bus interface configured to connect to a control bus using a control bus protocol, where at least a second device is configured to connect to the control bus; a configuration service configured to receive, through the control bus interface and from the second device, configuration data for the peripheral interface protocol; and a link state machine configured to reestablish, using the configuration data received from the second device, communication through the peripheral interface to the host system. Other embodiments of this aspect include corresponding computer systems, apparatus, and computer programs recorded on one or more computer storage devices, each configured to perform the actions of the methods.

Implementations may include one or more of the following features. The first device may further include a control bus messaging service configured to: establish communication with the second device over the control bus; send, to the second device and during a first operating period, a first peer message including the configuration data; and send, to the second device and during a second operating period, a second peer message to request the configuration data. The configuration service may be further configured to determine, based on establishing communication through the peripheral interface to the host system during the first operating period, the configuration data; the second operating period may be after the first operating period; and reestablishing communication through the peripheral interface may be during the second operating period. The second operating period may be responsive to a loss of connection event for the peripheral interface selected from: a power cycling event, a cold boot event, a reboot event, a reset event, a power state change event, and a link error event. The first device may further include a control bus messaging service configured: to establish communication with a plurality of connected devices including the second device; and broadcast, to the plurality of connected devices, a first peer message including the configuration data, where each connected device of the plurality of connected devices is configured to store the configuration data. The first device and each connected device of the plurality of connected devices may be configured to store a connected device registry; each connected device registry may include connected device entries corresponding to each other device of the plurality of connected devices and the first device; and each connected device entry may include a connected device identifier and corresponding configuration data. The configuration data may include a set of coefficient values for physical link training and the link state machine may be further configured to negotiate, using the configuration data, physical link training between the first device and the host system according to the peripheral interface protocol to reestablish communication through the peripheral interface. The set of coefficient values may include coefficient presets for physical link filter values selected from a plurality of coefficient presets defined by the peripheral interface protocol. The system may include a plurality of data storage devices configured for: storage communication with the host system through a peripheral interface bus using the peripheral interface protocol; and peer data storage device communication with each other data storage device of the plurality of data storage devices through the control bus using the control bus protocol, where the first device is a first data storage device of the plurality of data storage devices and the second device is a second data storage device of the plurality of data storage devices. The first device may be a data storage device and the second device may be selected from: the host system including a host control bus interface configured for communication with the data storage device through the control bus using the control bus protocol and a basic input output system configured to store the configuration data from a prior operating period for the data storage device; and a baseboard management controller including a management control bus interface configured for communication with the data storage device through the control bus using the control bus protocol and a management memory configured to store the configuration data from a prior operating period for the data storage device. The system may include a plurality of data storage devices configured for: storage communication with the host system through a peripheral interface bus using the peripheral interface protocol; and control bus communication with the host system through the control bus using the control bus protocol, where, during data storage device initialization, control bus communication is established prior to storage communication. The system may include the host system that includes: a host control bus interface configured for communication with the plurality of data storage devices through the control bus using the control bus protocol; and a memory configured to store, for each data storage device of the plurality of data storage devices, configuration data from a prior operating period for that data storage device, where: the first device is a data storage device from the plurality of data storage devices and the second device is the host system.

Another general aspect includes a computer-implemented method that includes connecting, by a first device using a control bus protocol, to a control bus, where at least a second device is configured to connect to the control bus; receiving, through the control bus and from the second device, configuration data for a peripheral interface protocol; initiating, by the first device and through a peripheral interface, a connection to a host system using the peripheral interface protocol; and reestablishing, using the configuration data received from the second device, communication through the peripheral interface to the host system.

Implementations may include one or more of the following features. The computer-implemented method may include: determining, based on establishing communication through the peripheral interface to the host system during a first operating period, the configuration data; establishing, by the first device, communication with the second device over the control bus; sending, from the first device to the second device and during the first operating period, a first peer message including the configuration data; and sending, to the second device and during a second operating period, a second peer message to request the configuration data, where the second operating period is after the first operating period and reestablishing communication through the peripheral interface is during the second operating period. The computer-implemented method may include determining, by the first device, a loss of connection event for the peripheral interface, where the loss of connection event may be selected from: a power cycling event, a cold boot event, a reboot event, a reset event, a power state change event, and a link error event; and the second operating period may be responsive to the loss of connection event. The computer-implemented method may include: establishing, by the first device, communication with a plurality of connected devices including the second device; broadcasting, by the first device and to the plurality of connected devices, a first peer message including the configuration data; and storing, by each connected device of the plurality of connected devices, the configuration data. The computer-implemented method may include storing, by the first device and each connected device of the plurality of connected devices, a connected device registry, where: each connected device registry includes connected device entries corresponding to each other device of the plurality of connected devices and the first device; and each connected device entry includes a connected device identifier and corresponding configuration data. The computer-implemented method may include negotiating, using the configuration data, physical link training between the first device and the host system according to the peripheral interface protocol to reestablish communication through the peripheral interface, where the configuration data may include a set of coefficient values for physical link training. The set of coefficient values may include coefficient presets for physical link filter values selected from a plurality of coefficient presets defined by the peripheral interface protocol. The first device may be a first data storage device of a plurality of data storage devices configured for peer communication though the control bus and storage communication with the host system through a peripheral interface bus; and the second device may be a second data storage device of the plurality of data storage device. The computer-implemented method may include: receiving, by the host system and through the control bus, the configuration data from the first device during a first operating period;

storing, in a memory of the host system, the configuration data during the first operating period; and sending, by the host system and through the control bus, the configuration data to the first device prior to reestablishing communication through the peripheral interface during a second operating period.

Still another general aspect includes a storage system that includes a plurality of data storage devices and each data storage device includes: a storage interface configured to connect to a host system; a control bus interface configured to connect to a control bus; a storage medium configured to store host data; means for receiving, through the control bus interface and from another data storage device of the plurality of data storage devices, configuration data for a storage interface protocol; means for initiating, through the storage interface, a connection to the host system using the storage interface protocol; and means for reestablishing, using the configuration data received from another data storage device of the plurality of data storage devices, communication through the storage interface to the host system.

The various embodiments advantageously apply the teachings of storage devices, multi-device storage systems, and/or other computer peripherals to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve link connection times for peripheral interfaces, such as by using messaging over a control bus among connected devices to share configuration data. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
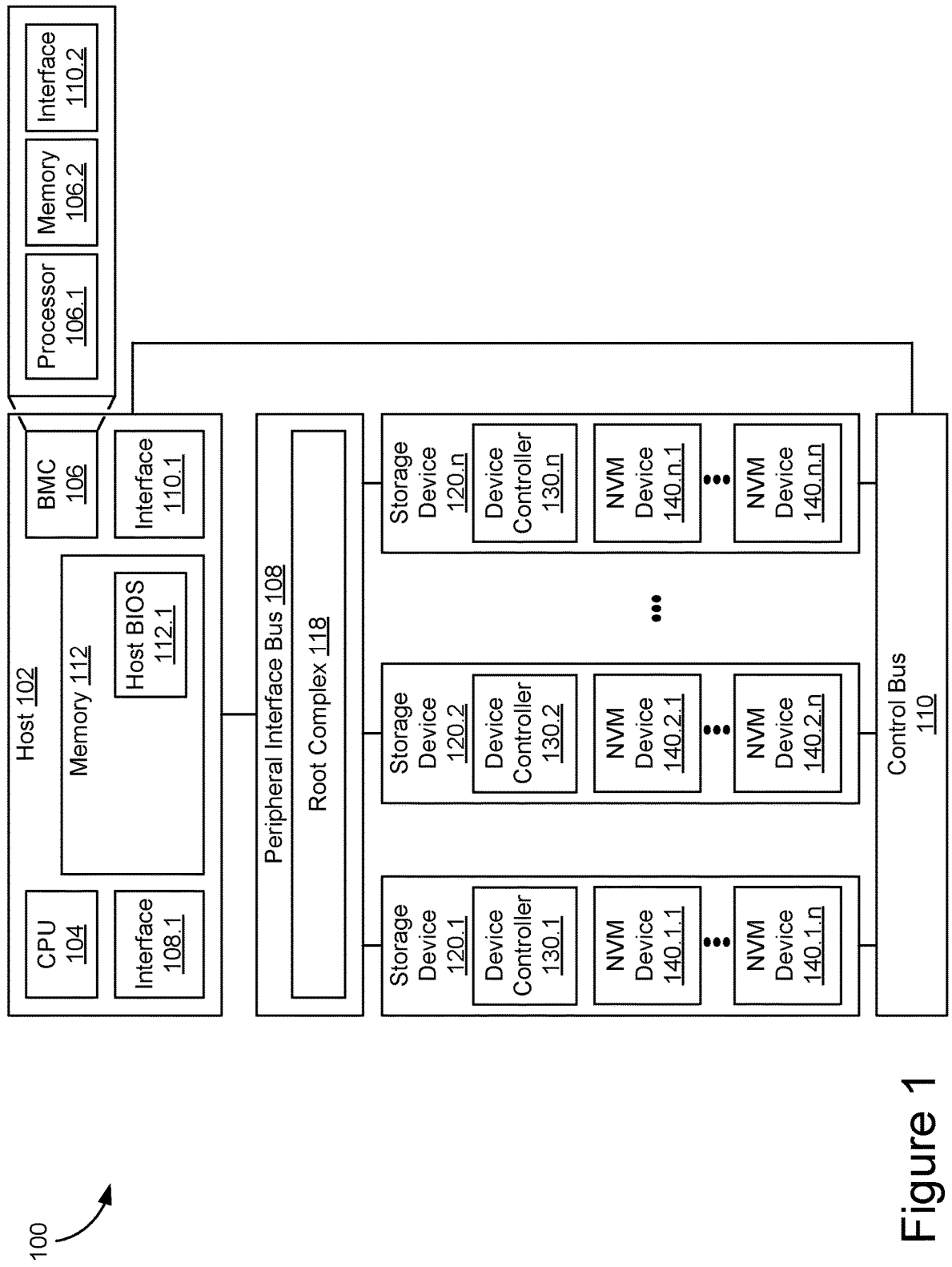
FIG. 1 schematically illustrates a multi-device storage system with a peripheral storage interface bus and a control bus.

FIG. 1 shows an embodiment of an example data storage system 100 with multiple data storage devices 120 interconnected by both peripheral interface bus 108 and control bus 110. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server or storage array blade or similar storage unit for use in data center storage racks or chassis. Storage devices 120 may interface with one or more hosts 102 and provide data storage and retrieval capabilities for or through those host systems. In some embodiments, storage devices 120 may be configured in a storage hierarchy that includes storage nodes, storage controllers, and/or other intermediate components between storage devices 120 and host 102. For example, each storage controller may be responsible for a corresponding set of storage nodes and their respective storage devices connected through a corresponding backplane network, though only storage devices 120 and host 102 are shown.

In the embodiment shown, a number of storage devices 120 are attached to a common peripheral interface bus 108 for host communication. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through peripheral interface bus 108 and/or control bus 110. For example, storage devices 120 may connect to peripheral interface bus 108 and/or control bus 110 through a plurality of physical port connections that define physical, transport, and other logical channels for establishing communication with the different components and subcomponents for establishing a communication channel to host 102. In some embodiments, peripheral interface bus 108 may be configured as a storage interface bus and provide the primary host interface for storage device management and host data transfer, and control interface bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through peripheral interface bus 108, with or without the assistance of host 102. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, storage devices 120 may be configured for peer communication using multi-master discovery and messaging compliant with a low-bandwidth interface standard. For example, storage devices 120 may be configured for packet-based messaging through control bus 110 using a low-bandwidth bus protocol, such as inter-integrated circuit (I2C), improved inter-integrated circuit (I3C), system management bus (SMBus), etc. Storage devices 120 may be interconnected by a common control bus to provide a low-bandwidth communication channel with host 102 and other system components to assist with power management, discovery, and access to external resources, such as temperature sensors, fan controllers, light emitting diode (LED) indicators, etc. For example, control bus 110 may connect storage devices 120 to a baseboard management controller (BMC) 106 for monitoring the physical and power states of storage devices 120 for host 102. In some embodiments, BMC 106 may be embodied in a separate host or controller device to provide an integrated platform services interface and management of power and physical states across one or more storage systems. For example, BMC 106 may include a dedicated management processor 106.1, management memory 106.2, and management control bus interface 110.2. Storage devices 120 may be defined as peer storage devices based on their connection to a shared control bus 110. In some configurations, each device connected to control bus 110 may be referred to as a connected device, which may include storage devices 120, host 102 and/or BMC 106. Other devices connected to the control bus (but not shown in FIG. 1) may also be connected devices in data storage system 100, such as fan controllers, sensor arrays, network interface controllers, processor devices (e.g., graphics processor units), and/or other devices managed by BMC 106.

In some embodiments, data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with peripheral interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, host or host system 102 may be coupled to data storage system 100 through a network interface that is part of host fabric network that includes storage interface bus 108 as a host fabric interface. In some embodiments, multiple host systems 102 (only one of which is shown in FIG. 1) are coupled to data storage system 100 through the fabric network, which may include a storage network interface or other interface capable of supporting communications with multiple host systems 102. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks.

Host system 102, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system. In some embodiments, host system 102 is a server system, such as a server system in a data center, or a storage system, such as a storage array in a data center. In some embodiments, the one or more host systems 102 are one or more host devices distinct from a storage controller or storage node housing the plurality of storage devices 120. The one or more host systems 102 may be configured to store and access data in the plurality of storage devices 120.

Host system 102 may include one or more central processing units (CPUs) 104 for executing compute operations or instructions for accessing storage devices 120 through peripheral interface bus 108. In some embodiments, CPU 104 may include a host processor and be associated with an operating memory 112 for executing both storage operations and a storage interface protocol compatible with peripheral interface bus 108 and storage devices 120. In some embodiments, memory 112 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over peripheral interface bus 108 to access and use the host memory buffer allocated to that storage device. Memory 112 may also include an operating system (not shown), firmware, and/or software applications for executing various functions of host system 102. In some configurations, memory 112 may include a host basic input output system (BIOS) 112.1 for establishing basic communication among components of host system 102 during boot up. In some embodiments, host BIOS 112.1 may have access to control bus 110 through host control bus interface 110.1 and may be configured for messaging among connected devices prior to establishing communication through peripheral interface bus 108.

In some embodiments, a separate storage interface unit or controller (not shown) may provide the storage interface protocol and related processor and memory resources. Host system 102 may include interface ports for connecting to peripheral interface bus 108 and/or control bus 110. For example, host system 102 may include a peripheral bus interface 108.1 and a control bus interface 110.1 for physically connecting to the respective peripheral interface bus 108 and control bus 110. Host 102, peripheral interface bus 108, and/or a storage interface unit may include a root complex 118 for the peripheral interface protocol that manages connection and communication over peripheral interface bus 108. For example, root complex 118 may be configured as a PCIe root complex that connects the CPU and memory subsystems to the PCIe switch fabric composed of various endpoints, which may include storage devices 120, host system 102, and other devices connected to peripheral interface bus 108. In some embodiments, host system 102 may provide the processor and memory resources to support root complex 118. From the perspective of storage devices 120, peripheral interface bus 108 may be referred to as a host interface bus and provides a host data path between storage devices 120 and host 102.

Host system 102 may include a BMC 106 configured to monitor the physical state of host 102, storage devices 120, and/or other components of data storage system 100. In some embodiments, BMC 106 may include management processor 106.1, management memory 106.2, management control bus interface 110.2, sensors, fan controllers, and other resources integrated in BMC 106 and/or accessible over control bus 110. BMC 106 may be configured to measure internal variables within a housing, adjacent components, and/or from the components themselves within host 102 or data storage system 100, such as temperature, humidity, power-supply voltage, fan speeds, communication parameters, and/or operating system (OS) functions. BMC 106 may enable systems and components to be power cycled or rebooted as needed through control signals over control bus 110. In some embodiments, BMC 106 may be configured to receive status communication from storage devices 120 through control bus 110 during boot cycles, prior to initialization of host communication through peripheral interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2A:
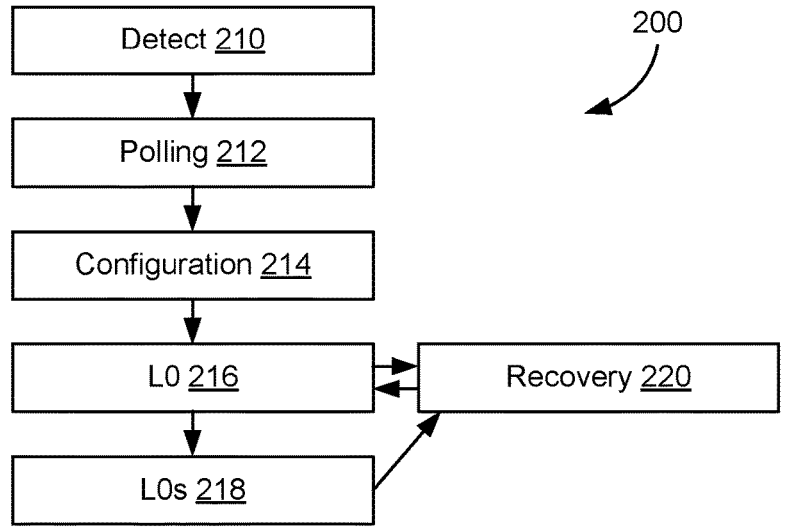
FIG. 2A schematically illustrates a prior art state machine for peripheral interface link training.

FIG. 2A shows a schematic representation of an example state machine 200 for establishing link communication across a peripheral interface bus using a peripheral interface protocol, such as PCIe. For example, state machine 200 may include a link training and status state machine (LTSSM) configured to enable two devices to exchange training data to negotiate a number of link parameters, such as lane polarity, lane numbers, equalization, data rate, etc., in order to establish a physical data link meeting a target bit error rate to support a high-throughput data signal and two-way communication over a physical peripheral interface connection, such as a peripheral interface bus. Link training establishes analog signaling across the peripheral interface bus and corresponding logical encoding for the transmission of data bits in the analog signal. Once the physical link training is established and the desired bit error rate is met, higher-level communication may be enabled through a data link layer for managing data packets, flow control, and acknowledgements. The data link layer supports a transaction layer for various configuration, messaging, and memory or input/output (I/O) transactions. The data link layer supports an application layer for packaging data in the payload of the transactions. For example, at the application layer, a storage interface protocol specific to the data storage devices, such as NVMe commands, may be implemented.

In detect state 210, state machine 200 detects when a device is present on the physical connection. In polling state 212, state machine 200 transmits training ordered sets of data and responds to receiving trained ordered sets. In this state, bit lock and symbol lock are established, as is the configuration of lane polarity. In configuration state 214, state machine 200 enables both end point devices, transmitter and receiver, to send and receive data at a target data rate. During this state, the port may be configured into a link with configured and negotiated lanes and widths. In link 0 (L0) state 216, the normal operational state of the physical link layer is established by state machine 200. During this state, data and control packets from the higher layers may be transmitted and received and application-level communication between the devices may be achieved. In link 0 power saving state (L0s) state 218, a physical link may enter and recover from a power saving state. In some configurations, additional power saving states may be possible and may be accessed through L0s state 218. In recovery state 220, both devices, transmitter and receiver, may be sending and receiving data using configured link and lane configurations at previously supported data rates, but may be experiencing bit error rates that do not support reliable communication at the supported data rates. In this state, the devices may change the data rate, reestablish bit lock and symbol lock, change block alignment, and adjust lane-to-lane de-skew. Additional states and state transitions (not shown) may be supported by state machine 200.

Figure 2B:
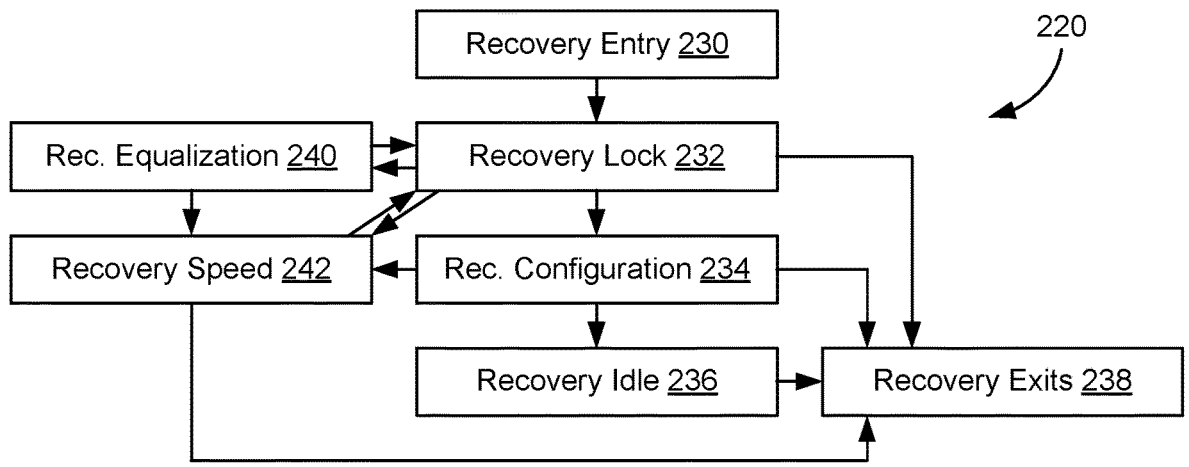
FIG. 2B schematically illustrates recovery of high-throughput communication as part of the prior art state machine of FIG. 2A.

As shown in FIG. 2B, recovery state 220 may include a recovery substate machine that governs the recovery state and exits back to various states in state machine 200. At recovery entry 230, the recovery substate machine is initiated for attempting to change the configuration of a communication channel. Recovery lock substate 232 enables the devices to exchange training data sequences to reestablish and test bit and symbol lock. Recovery configuration state 234 enables the devices to reestablish and test link and lane configurations. Recovery idle substate 236 enforces a timeout period before exiting the recovery state at recovery exits 238. Recovery exits 238 may return to any of the states of state machine 200, depending on the entry and exit conditions for recovery state 220. Recovery equalization substate 240 may enable the devices to train the electrical parameters of the link for a specific pair of endpoints. For example, recovery equalization 240 may determine a set of coefficient values negotiated between the two devices for setting the physical link filter values of their respective equalization filters on their transmitters and receivers. In some embodiments, a peripheral interface protocol may define a series of preset values for transmitter and receiver equalizer coefficients, including a set of default filter values used to initialize the training process. For example, a peripheral interface protocol may define a default set of coefficient values and a series of additional sets of preset coefficient values and the training process may increment through the presets until the selected coefficient values achieve the desired bit error rate at the selected data rate. The link training process used in recovery equalization 240 may be further described with regard to FIG. 3 below. Recovery speed 242 may include a data rate speed test across the link to determine whether a desired data rate is achieved (at an acceptable error rate).

Recovery state 220 may enable state machine 200 to manage speed changes, link width changes, errors in L0 state 216, return from low power link states (e.g., L0s state 218), and/or recovery from L0 state of the link does not train properly in an earlier iteration. In some embodiments, recovery state 220 may be used to move link connections through higher generations and corresponding throughputs to achieve a desired throughput for the peripheral interface connection. For example, each physical link may initially be trained to a throughput of 2.5 gigatransfers per second (GT/s), then recovery state 220 may be used to change the throughput to 5 GT/s and return to L0 state 216. Recovery state 220 may be used again to increment the throughput to 8 GT/s and so on to achieve the throughput supported by the generation of the peripheral interface protocol and configuration of the devices.

Figure 3:
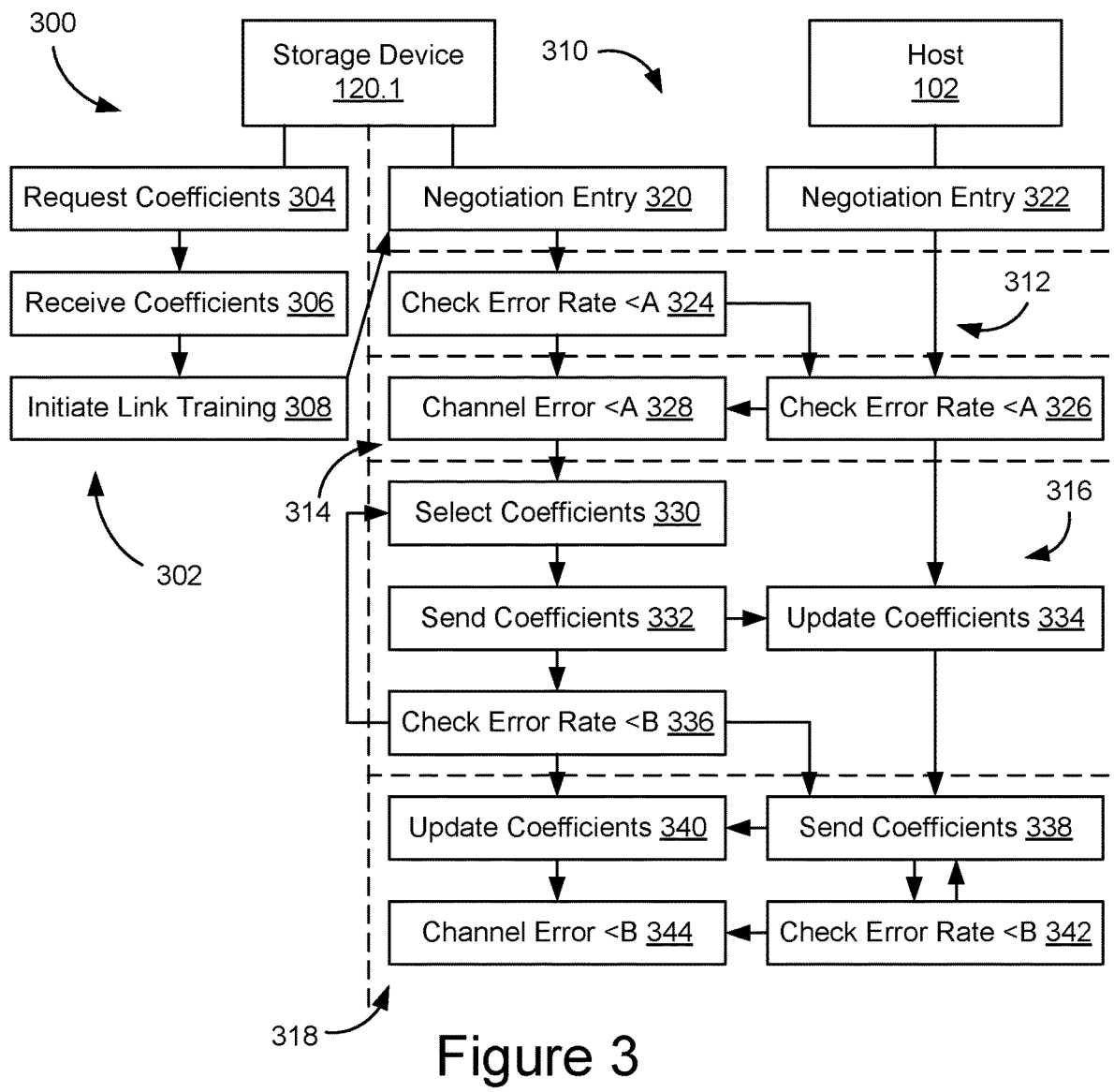
FIG. 3 schematically illustrates phased negotiation of the physical link coefficients for a peripheral interface using prior coefficient values received from a connected device.

FIG. 3 shows a schematic representation of phased negotiation of the physical link coefficients for a peripheral interface in an example storage system 300, such as multi-device data storage system 100 in FIG. 1, using prior coefficient values received from a connected device. As described above, storage device 120.1 and host system 102 may be connected by a peripheral interface bus and periodically negotiate coefficient values to establish physical link communication and support data link, transaction, and application-level communication across the peripheral interface. For example, recovery equalization substate 240 may initiate link training between storage device 120.1 and host system 102 to establish equalization parameters that obtain acceptable signal integrity meeting a desired bit error rate (BER) level. During link training, the sides negotiate sets of coefficient values for their respective transmitter and receiver equalizer circuits until the bit error rate meets a target threshold, such as $10^{-12}$ BER. In some configurations, link training may take significant time and be completed independently for each lane port of the peripheral interface. For example, finding the best coefficient values may take up to 24 milliseconds (mS) in each direction for each lane (and peripheral bus configurations may support 16 or more lanes). Storage device 120.1 and/or host system 102 may be configured for control bus communication with one or more other connected devices and may be able to use the control bus communication to retrieve previously stored coefficient values to reduce the link training time.

In the configuration shown, storage device 120.1 is configured with a control bus connection and has stored coefficient values from a prior operating period when the physical links were trained to the desired bit error rate for the target data throughput. The coefficient values may have been stored to one or more other storage devices, such as storage devices 120.2-120.*n*, host BIOS 112.1, BMC 106, or another connected device with control bus messaging and local memory. Prior to link training, storage device 120.1 may execute a recall process 302 to retrieve the previously stored coefficients. Recall process 302 may be triggered when storage device 120.1 boots, reboots, or recovers from a low power mode where the previously used coefficients are lost and, in some embodiments, volatile memory was cleared. At block 304, a set of coefficients may be requested from one or more connected devices to which the coefficients were previously sent for storage. For example, storage device 120.1 may have designated another storage device to backup its coefficients and may send a message over the control bus to request the set of previously stored coefficient values for the peripheral interface connection to host 102. At block 306, the set of previously stored coefficient values may be received from the connected device though the control bus. For example, the other storage device may respond with a message that includes the set of previously stored coefficient values in the payload of the message. At block 308, link training may be initiated. For example, coefficient recall process 302 may complete prior to or in parallel with the link training state machine initializing the peripheral interface and moving through the various states for establishing communication. Upon boot or waking, control bus communication may be established before communication through the peripheral interface. The goal may be for coefficients to be received at block 306 before the link training state machine reaches physical link negotiation for the recalled coefficients to be available in negotiation process 310. Note that entry of physical link negotiation at blocks 320 and 322 may not be dependent on recall process 302 completing and that negotiation process 310 may proceed without the recalled coefficients in accordance with prior methods of physical link negotiation from default values.

Physical link negotiation process 310 may be configured in phases and executed between an upstream device, such as a root complex controlled by host 102, and a downstream device, such as storage device 120.1. At blocks 320 and 322, both devices will enter negotiation to determine the set of equalizer coefficients that achieve an acceptable bit error rate for the current data rate. For example, the link training state machine, such as state machine 200, may enter a recovery state and initiate a recovery equalization substate. In phase 312, such as phase 0 in some peripheral interface protocols, storage device 120.1 may verify the channel by checking that its receiver bit error rate is lower than a first BER threshold A, such as $10^{-4}$ BER, at block 324. For example, host system 102 may transmit a known training data set and storage device 120.1 may receive, decode, and compare the received data to the known data sequence to determine the bit error rate and compare it to the first BER threshold. In phase 314, such as phase 1 in some peripheral interface protocols, host system 102 may verify the channel by checking that its receiver bit error rate is lower than the first BER threshold A, such as $10^{-4}$ BER, at block 326. For example, storage device 120.1 may transmit the known training data set and host system 102 may receive, decode, and compare the received data to the known data sequence to determine the bit error rate and compare it to the first BER threshold. At the end of phase 315, both devices have confirmed that the channel error rate us less than BER threshold A and a minimal level data transfer and integrity has been met.

In phase 316, such as phase 2 in some peripheral interface protocols, the downstream device may iteratively tell the upstream device to use specific sets of presets corresponding to desired coefficient values for the upstream device transmitter and then verify the channel until a second and lower BER threshold B, such as $10^{-12}$ BER, is met. By using the recalled set of coefficient values from recall process 302, storage device 120.1 may accelerate the negotiation of the coefficient values, ideally to a single exchange, rather than iteration through the available presets. In some embodiments, coefficient values may be determined for equalizers on both the transmitter and receiver sides of the channel (noting that both devices have both transmit and receive functions). For example, the transmit side coefficients may include filter tap weights for determining de-emphasis and pre-shoot of the transmitted analog signal and the receive side coefficients may include parameters for continuous-time linear equalization and decision feedback equalization filters.

At block 330, coefficients may be selected for an iteration of phase 316. For example, storage device 120.1 may select an initial set of coefficients to attempt to achieve BER threshold B. If recall process 302 has completed, storage device 120.1 may select the set of coefficients received at block 306. If recall process 302 has not completed, storage device 120.1 may select a default set of coefficients determined by the storage interface protocol. In some embodiments, the recalled set of coefficients may include receiver coefficients and storage device 120.1 may use the recalled set of coefficients to set its receiver coefficients at a block 330. At block 332, the coefficients may be sent to host system 102 using the peripheral connection and compensating for the current channel error rate. For example, storage device 120.1 may send the recalled set of coefficients or the default set of coefficients (as actual values or by reference to defined presets) for the host-side transmitter. At block 334, host system 102 updates the transmitter coefficients based on the set of coefficients. For example, host system 102 may change the filter coefficients for the transmitter and send training data sets from the transmitter back to storage device 120.1. At block 336, the bit error rate of the channel may be checked to see if it is less than BER threshold B. For example, storage device 120.1 may receive, decode, and compare the training data sets to the known training data set sequence to determine the bit error rate, then compare the bit error rate to BER threshold B. If BER threshold B is met, then operation may proceed to phase 318. If BER threshold B is not met, storage device 120.1 may iterate through blocks 330-336, selecting different sets of coefficients from the available range of values, until BER threshold B is met. Ideally, the recalled coefficient values may reduce the number of iterations to a single pass. However, if previously stored coefficient values are not available or they do not result in BER threshold B being met (such as due to a change in the physical configuration of interconnects or other changes that impact the signal characteristics of the peripheral channel), the normal iterative process may be used to negotiate the coefficients for the transmitter of host system 102.

In phase 318, such as phase 3 in some peripheral interface specifications, the upstream device may perform a similar process to train the coefficient values for its receiver and the transmitter of the downstream device. Similarly, it may use BER threshold B for evaluating the success of the training. In the embodiment shown, host system 102 is not using recalled coefficient values and uses the default iterative training method. Note that in other embodiments, host system 102 may include a control bus connection and may also benefit from previously stored configuration data being recalled from other connected devices to accelerate this phase as well. At block 338, the coefficients may be sent to storage device 120.1 using the peripheral connection and compensating for the current channel error rate. For example, host 102 may send the default set of coefficients (as actual values or by reference to defined presets) or the next set of coefficients to try for the device-side transmitter. At block 340, storage device 120.1 updates the transmitter coefficients based on the received set of coefficients from host system 102. For example, storage device 120.1 may change the filter coefficients for the transmitter and send training data sets from the transmitter back to host system 102. At block 342, the bit error rate of the channel may be checked to see if it is less than BER threshold B. For example, host system 102 may receive, decode, and compare the training data sets to the known training data set sequence to determine the bit error rate, then compare the bit error rate to BER threshold B. If BER threshold B is met, then channel error may be verified as less than BER threshold B at block 344 and negotiation process 310 may successfully end. If BER threshold B is not met, host system 102 may iterate through blocks 338-342, selecting different sets of coefficients from the available range of values, until BER threshold B is met.

Figure 4:
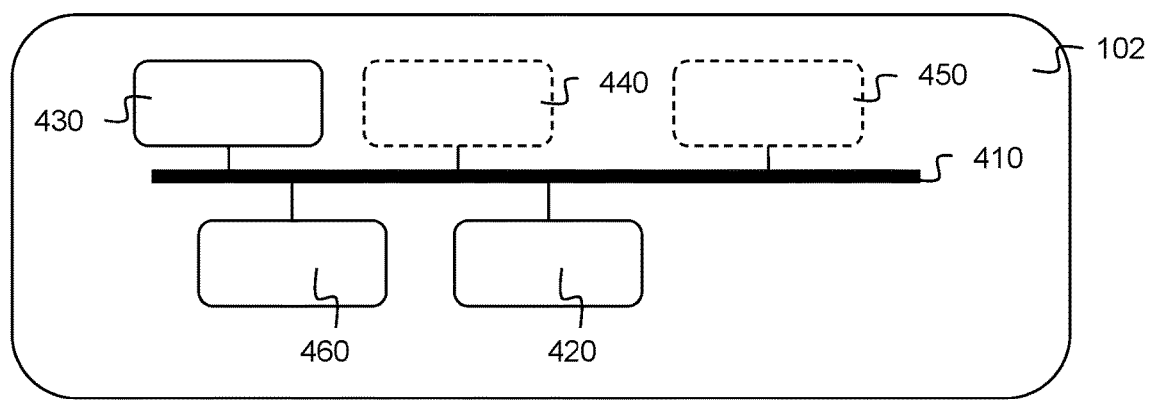
FIG. 4 schematically illustrates a host node of the multi-device storage system of FIG. 1.

FIG. 4 shows a schematic representation of an example host system 102. Host system 102 may comprise a bus 410, a processor 420, a local memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, host driver 116 in FIG. 1 may be instantiated in instructions, operations, or firmware stored in local memory 430 for execution by processor 420. An optional input unit 440 may include one or more conventional mechanisms that permit an operator to input information to host 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe interface for connecting to storage devices 120.

Figure 5:
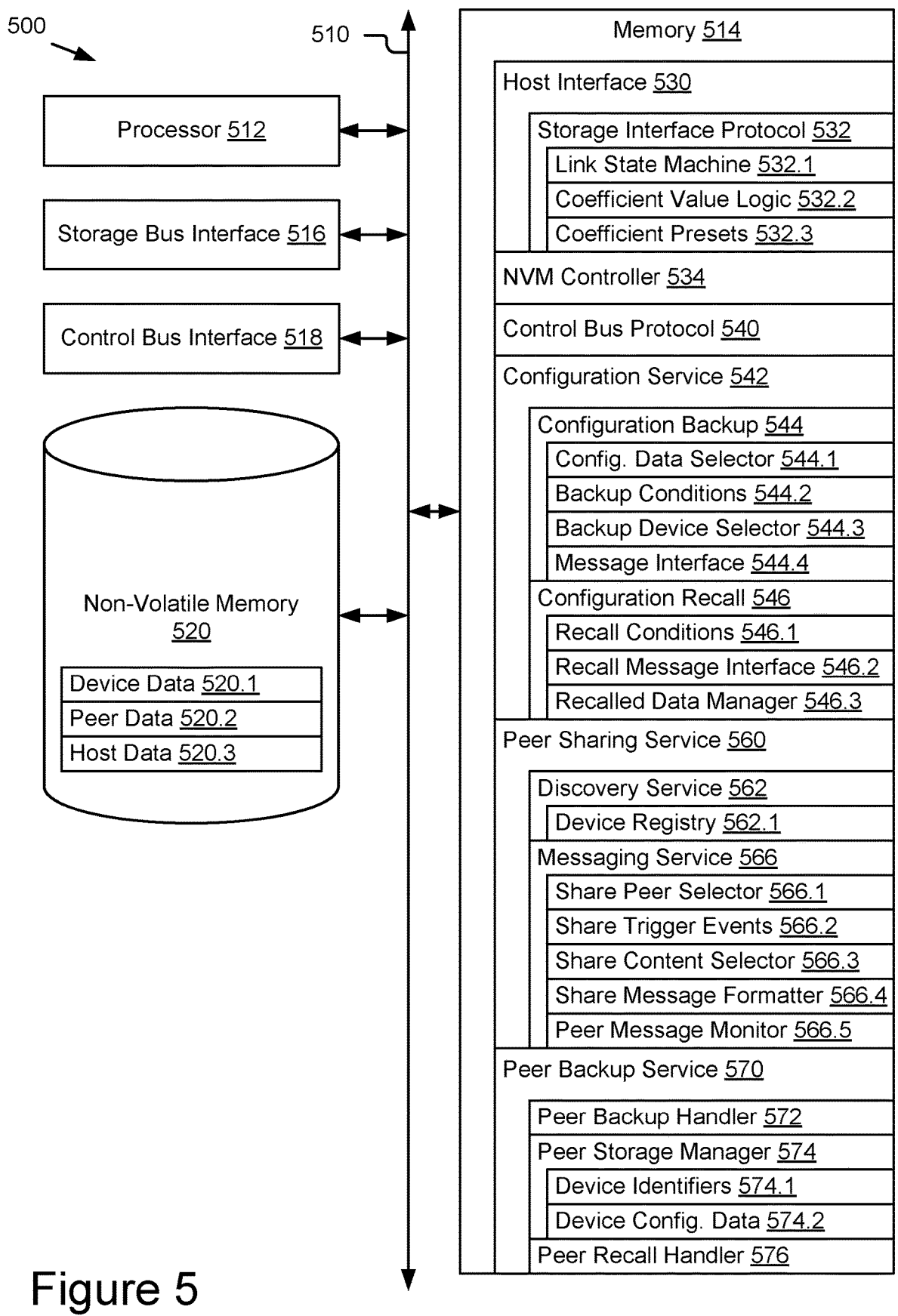
FIG. 5 schematically illustrates some elements of the data storage devices of FIG. 1 in more detail.

FIG. 5 schematically shows selected modules of a storage device 500 configured for accelerating physical link training by backing up and recalling previously trained configuration data from a peer storage device, such as storage devices 120. In some embodiments, storage device 500 may use another connected device, such as the BIOS of a host system or a BMC, to backup and recall configuration data over a shared control bus. Storage device 500 may incorporate elements and configurations similar to those shown in FIGS. 1-3. For example, storage device 500 may be configured as a storage device 120 in a set of peer storage devices interconnected by a control bus and including a peripheral bus interface for transferring host data in a multi-device data storage system.

Storage device 500 may include a bus 510 interconnecting at least one processor 512, at least one memory 514, and at least one interface, such as storage bus interface 516 and control bus interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to a host using a peripheral interface protocol that supports storage device access. For example, storage bus interface 516 may include a PCIe, SATA, SAS, or similar storage interface connector supporting NVMe access to solid state media comprising non-volatile memory devices 520. Control bus interface 518 may include a physical interface for connecting to a control bus using a low-bandwidth interface protocol for low-level control messaging among computing components. For example. control bus interface 518 may include a I2C, I3C, SMBus, or similar bus interface connector supporting component-to-component messaging, such as multi-master, packet-based messaging over a two-wire bus.

Storage device 500 may include one or more non-volatile memory devices 520 configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests from client or host systems. Memory 514 may include a non-volatile memory (NVM) controller 534 configured to manage read and write operations to non-volatile memory devices 520. Memory 514 may include a control bus protocol 540 configured manage communication over control bus interface 518 in accordance with a determined protocol or standard. Memory 514 may include a configuration service 542 configured to support configuration of storage interface protocol 532 and, more specifically, an underlying peripheral interface protocol for establishing application-level communication for the storage interface protocol by backing up and recalling configuration data across operating periods. Memory 514 may include a peer sharing service 560 configured for communication among storage devices attached to the same control bus as storage device 500 and used for sharing configuration data. In some embodiments, peers may be defined as any connected device sharing the same control bus. Memory 514 may include a peer backup service 570 configured to receive and store configuration data from peer devices to support their backup and recall of configuration data.

Host interface 530 may include an interface protocol and/or set of functions and parameters for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. In some embodiments, host interface 530 may enable direct memory access and/or access over NVMe protocols through storage bus interface 516 to host data units 520.3 stored in non-volatile memory devices 520. For example, host interface 530 may include host communication protocols compatible with PCIe, SATA, SAS, and/or another bus interface that supports use of NVMe and/or RDMA protocols for data access to host data 520.3.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage bus interface 516. For example, storage interface protocol 532 may include both PCIe and NVMe compliant communication, command, and syntax functions, procedures, and data structures. In some embodiments, storage interface protocol 532 may include an interface protocol for managing physical links or channels, data link, and transaction layers to support application-level interactions in the payload of the interface protocol. For example, a peripheral interface protocol, such as PCIe, may define communication channels between storage device 500 and a host system through storage bus interface 516 and a corresponding peripheral interface bus. In some embodiments, host interface 530 may include additional modules (not shown) for command handling, buffer management, storage device management and reporting, and other host-side functions.

In some embodiments, storage interface protocol 532 may include a link state machine 532.1 configured to manage establishment and negotiation of the physical link and data link through storage bus interface 516. For example, link state machine 532.1 may be configured substantially as described with regard to state machine 200 in FIG. 2A, recovery state 220 in FIG. 2B, and physical link negotiation process 310 in FIG. 3. Link state machine 532.1 may include physical link negotiation to establish a physical and data link that supports a desired data rate for storage bus interface 516 meeting (at or below) a predefined BER threshold. In some embodiments, physical link training may be based on determining configuration data for the receivers and transmitters that transfer the analog data signals across the peripheral interface bus. For example, each link, lane, and/or channel may include receiver filters and transmitter filters (in both directions) with coefficients that are configured to establish data signal integrity meeting the predefined BER threshold. These sets of coefficient values may be determined and verified by link state machine 532.1 each time the physical and data link is established, such as on bootup, wakeup, or error recovery. In some embodiments, link state machine 532.1 may include or interface with coefficient value logic 532.2 configured to determine a set of coefficient values for initializing negotiation and each iteration (if needed) through the negotiation process. For example, link state machine 532.1 may include default logic for selecting and iterating through sets of coefficient values in the negotiation process. In some embodiments, coefficient value logic 532.2 may be configured to check for recalled configuration data stored in memory 514 by configuration service 542. For example, coefficient value logic 532.2 may check a register managed by configuration service 542 for previously used coefficient values. In some embodiments, coefficient value logic 532.2 may use a sequence of coefficient presets 532.3 to determine an initial set of coefficient values and iterate through other sets of coefficient values. For example, coefficient presets 532.2 may include a series of 11 or more preset sets of coefficient values that may be incrementally attempted in the negotiation process in the event that previously used coefficient values are unavailable and/or unsuccessful in meeting the BER threshold.

NVM controller 534 may include an interface protocol and/or set of functions and parameters for reading, writing, and deleting data units in non-volatile memory devices 520. For example, NVM controller 534 may include functions for executing host data operations related to host storage commands received through host interface 530. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. In some embodiments, NVM controller 534 may include flash translation layer (FTL) management, data state machine, read/write buffer management, NVM device interface protocols, NVM device configuration/management/maintenance, and other device-side functions. In some embodiments, NVM controller 534 may be configured to allocate a portion of the memory locations in non-volatile memory devices 520 for storing data other than host data 520.3. For example, NVM controller 534 may allocate device data 520.1 as memory locations reserved for internal device data, including device configuration, parameter, and internal operation data. In some embodiments, NVM controller 534 may allocate peer data 520.2 as memory locations reserved for internal device data received from and about peer storage devices, including internal operation data and/or configuration data from those peer storage devices. In some embodiments, storage space allocated to device data 520.1 and/or peer data 520.2 may be excluded from the storage capacity made available to host data 520.3, such as overprovisioned storage locations hidden from the host for use storing internal operation data, FTL tables, replacing bad blocks, etc.

Control bus protocol 540 may include interfaces, functions, and parameters for communication within the host or an associated baseboard management controller (BMC) using multi-master discovery and messaging compliant with a low-bandwidth interface standard. For example, storage device 500 may be configured for packet-based messaging through control bus interface 518 using a low-bandwidth bus protocol, such as I2C, I3C, SMBus, etc. Control bus protocol 540 may include a plurality of hardware and/or software modules configured to use processor 512, memory 514, and control bus interface 518 for communication with host components, including peer storage devices on the same control bus, using a control bus protocol supported by the connected control bus. In some embodiments, control bus protocol 540 may provide a low-bandwidth communication channel with the host and other system components to assist with power management, discovery, and access to external resources, such as temperature sensors, fan controllers, light emitting diode (LED) indicators, etc. For example, control bus interface 518 may connect storage device 500 to a BMC for monitoring the physical state of storage device 500. In some embodiments, control bus protocol 540 may provide the discovery and messaging functions used by peer sharing service 560.

Configuration service 542 may include interface protocols and a set of functions and parameters for using previously stored configuration data to support connection and establishment of host communication through storage bus interface 516 for storage device 500. For example, configuration service 542 may backup configuration data to other connected devices through control bus interface 518 to be able to quickly recall that configuration data during subsequent bootup, power mode, or error recovery changes to accelerate physical link training and negotiation. More specifically, configuration service 542 may support link state machine 532.1 and coefficient value logic 532.2 with configuration data, such as sets of coefficient values for link negotiation, when prior configuration data is not otherwise accessible to link state machine 532.1. Configuration service 542 may include a plurality of hardware and/or software modules configured to use processor 512, memory 514, and peer sharing service 560 for supporting storage interface protocol 532. For example, configuration service 542 may include a configuration backup module 544 for determining and sending configuration data for backup. Configuration service 542 may include a configuration recall module 546 for recalling configuration data for use by storage interface protocol 532.

Configuration backup module 544 may include data structures, functions, parameters, and/or interfaces for accessing or receiving configuration data from storage interface protocol 532 and sending the configuration data to other connected devices over control bus interface 518. For example, configuration backup module 544 may access the current set of coefficient values for the peripheral interface channels after successful link training and normal application-level communications have been established through storage bus interface 516 and send them to a peer storage device to store until needed. In some embodiments, configuration backup module 544 may include a configuration data selector 544.1 configured to select the configuration data to be backed up. For example, configuration data selector 544.1 may include an interface and function to access configuration parameters stored by storage interface protocol 532, such as signal conditioning and data encoding parameters, including coefficient values negotiated between storage device 500 and a host system. In some embodiments, backup conditions 544.2 may include events, trigger states, and/or other operating conditions determining when configuration data selector 544.1 determines a set of configuration data to be backed up. For example, backup conditions 544.2 may monitor for link state machine 532.1 entering an operating link state and maintaining that link state for a predefined period of time (to assure a stable link has been configured) during an operating period and, responsive to determining a stable operating link, initiate configuration data selector 544.1 to determine a set of configuration data for backup. In some embodiments, a backup device selector 544.2 may determine one or more connected devices to receive and store the selected configuration data. For example, backup device selector 544.2 may be configured to select one or more peer storage devices and/or all peer storage devices to receive the backup configuration data. In some embodiments, one or more peer storage devices, the host system (where the host system is a connected device to the control bus), a BMC, or other connected devices may be configured as a dedicated backup device and/or part of a backup group and the set of connected devices for configuration backup module 544 to use may be configured in backup device selector 544.3. In some embodiments, configuration backup module 544 may include a backup message interface 544.4 that passes the selected configuration data and a set of connected device identifiers for the backup devices to messaging service 566. For example, backup message interface 544.4 may include an interface service for initiating messaging service 566, where the service calls from backup message interface 544.4 acts as share trigger events 566.2, the selected backup devices complete the share peer selector parameters, and the selected configuration data completes the share content selector parameters.

Configuration recall module 546 may include data structures, functions, parameters, and/or interfaces for requesting, receiving, and managing configuration data for storage interface protocol 532 that is recalled from other connected devices over control bus interface 518. For example, configuration recall module 544 may determine the previously stored configuration data is needed, trigger a recall message to be sent over the control bus, receive the recalled data and provide it to storage interface protocol 532. In some embodiments, configuration recall module 546 may include recall conditions 546.1 for determining events, trigger states, and other operating conditions when previously stored configuration data should be recalled from connected devices. For example, recall conditions 546.1 may include a set of loss of connection events for the peripheral interface selected from power cycling events, cold boot events, reset events, reboot events, power state change events; and link error events. In some embodiments, loss of connection events may include events where physical link connections for storage bus interface 516 are lost and link training and negotiation are expected. Loss of connection events may be determined from monitoring and/or triggering from general operational states, such as cold boot, power cycling, and power state changes, that may be identified at the system level before they necessarily invoke the link state machine 532.1 to enable initiating of configuration recall module 546 to recall the previously stored configuration data from connected devices before it is needed by storage interface protocol 532. In some embodiments, responsive to recall conditions 546.1, a recall message interface 546.2 may initiate a control bus message through messaging service 566 to recall the previously stored configuration data. For example, recall message interface may include an interface service for initiating messaging service 566 where the service calls from recall message interface 546.2 acts as share trigger events 566.2, the selected backup devices (from configuration backup module 544) complete the share peer selector parameters, and the configuration data request completes the share content selector parameters. When messaging service 566 receives one or more responses from connected devices with the previously backed up configuration data, the payload of those response messages may be returned to recalled data manager 546.3. In some embodiments, recalled data manager 546.3 may parse the payload data of the responses to determine a set of previously stored configuration data and provide the set of configuration data for use by storage interface protocol 532. For example, recalled data manager 546.3 may send the set of configuration data, such as a set of coefficient values, to coefficient value logic 532.2 and/or store the set of configuration data in a register or other memory location known to coefficient value logic 532.2 for storing previously used configuration data, if available.

Peer sharing service 560 may include an interface protocol and set of functions and parameters for discovering peer storage devices and sending and receiving messages with those peer storage devices, such as sharing configuration data for the peripheral interface supporting storage interface protocol 532. For example, peer sharing service 560 may include functions for utilizing low-bandwidth communications through control bus interface 518 using control bus protocol 540. In some embodiments, peer sharing service 560 may include management of peer data 520.2 in non-volatile memory devices 520 for storing peer internal operation data and/or may support passing data, such as configuration data, to other components, such as configuration service 542.

In some embodiments, peer sharing service 560 may include a plurality of hardware and/or software modules configured to use processor 512 and memory 514 to handle or manage defined operations of peer sharing service 560. For example, peer sharing service 560 may include a discovery service 562 and/or a messaging service 566. For example, discovery service 562 may be configured to discover peer storage devices and/or other connected devices on a shared control bus and store their addresses for use by messaging service 566. Messaging service 566 may be configured to send and receive one-to-one and/or broadcast messages to and from peer storage devices over the shared control bus.

Discovery service 562 may include data structures, functions, and interfaces for discovering peer or connected devices on a control bus and determining peer device addresses for use by peer sharing service 560. For example, during initialization or startup of storage device 500, discovery service 562 may broadcast its device identifier or address and receive similar broadcasts from other devices to accumulate device information for other devices on the control bus. In some embodiments, discovery service 562 may include a peer device registry 562.1 configured to store connected device identifiers, control bus addresses, and/or other connected device information to establish and support communication with peer devices. For example, peer device registry 562.1 may include a data table or other data structure in memory 514 and/or device data 520.1 that includes a plurality of connected device entries associated with corresponding control bus addresses. In some embodiments, discovery service 562 may include a device ID broadcaster configured to determine the storage device identifier and/or control bus address for storage device 500 and broadcast a message on the control bus to enable other devices on the control bus to discover storage device 500. For example, the device ID broadcaster may be triggered during ROM, boot loader, or firmware execution at startup or initialization of storage device 500, in response to a discovery message from another device, and/or another device discovery trigger in accordance with control bus protocol 540. In some embodiments, discovery service 562 may include a peer ID receiver configured to monitor communications through control bus interface 518, identify discovery broadcasts from other storage devices, and add a corresponding device identifier entry in device registry 520.1. For example, control bus protocol 540 may define syntax for broadcast messages, such as a broadcast address, a tag or similar parameter for designating a discovery broadcast, and data payload including the storage device identifier, control bus address, vendor identifier, etc. and the peer ID receiver may be configured according to parse messages meeting that syntax to extract peer storage device identifiers.

Messaging service 566 may include data structures, functions, and interfaces for sending and receiving messages to and from peer devices over the control bus. For example, control bus messaging service 566 may implement control bus protocol 540 to send and receive messages with other devices identified through discovery service 562. In some embodiments, messaging service 566 may send packetized data payloads over the control bus using block write and block read commands between buffers in the peer storage devices.

In some embodiments, messaging service 566 may include a share peer selector 566.1 configured to select a target or destination peer device to receive a message. For example, share peer selector 566.1 may include a parameter setting or algorithm for selecting a peer storage device to receive a message. Share peer selector 566.1 may receive an indication of the target peer device(s) in a call from another component, such as configuration service 542 and/or peer backup service 570. In some embodiments, messaging service 566 may include share trigger events 566.2 configured to determine when a message is sent to one or more peer devices. For example, share trigger events 566.2 may include a listener or message handler for internal calls from other components, such as configuration service 542 and/or peer backup service 570. In some embodiments, messaging service 566 may include a share content selector 566.3 configured to select the payload data content of messaging service 566. For example, share content selector 566.3 may receive payload data that includes indication of a recall request, configuration data and indication of a backup request, and/or configuration data and indication of a recall response from configuration service 542 and/or peer backup service 570. In some embodiments, messaging service 566 may include a share message formatter 566.4 configured to format a peer message in accordance with control bus protocol 540 to include the control bus address of the target peer storage device and the selected content in the data payload. For example, share message formatter 566.4 may generate or determine a header containing a control bus address and a read/write flag, followed by data payload and/or other parameters, such as command codes and/or error codes, to convey the configuration data.

In some embodiments, messaging service 566 may include a peer message monitor 566.5 configured to monitor control bus interface 518 for messages from peer devices addressed to storage device 500 (directly or via broadcast). For example, peer message monitor 566.5 may receive peer messages over the control bus that are initiated by peer storage devices and/or responsive to messages sent by messaging service 566. Peer message monitor 566.5 may parse received messages to determine whether further action is necessary, such as storing peer data, passing backup request configuration data to peer backup service 570, and/or passing recalled configuration data to configuration service 542.

Peer backup service 570 may include interface protocols and a set of functions and parameters for receiving, storing, and returning backup configuration data for other connected devices. For example, peer backup service 570 may support peer storage devices backing up their configuration data over the control bus to one or more peer devices, including storage device 500. In some embodiments, peer backup service 570 may include a plurality of hardware and/or software modules configured to use processor 512 and memory 514 to handle or manage defined operations of peer backup service 570. For example, peer backup service 570 may include a peer backup handler 572, a peer storage manager 574, and/or a peer recall handler 576. For example, peer backup handler 572 may be configured to receive backup requests from peer devices through messaging service 566. Peer storage manager 574 may be configured to store configuration data from peer devices for later recall. Peer recall handler 576 may be configured to receive recall requests from peer devices through messaging service 566 and provide previously stored configuration data back to peer devices through messaging service 566.

Peer backup handler 572 may include data structures, functions, parameters, and/or interfaces for receiving backup requests from peer devices through messaging service 566. For example, when messaging service 566 receives a backup request from a connected device, it may parse the message to identify it as a backup request and determine the set of configuration data to be stored. Messaging service 566 may pass the set of configuration data and the device identifier for the connected device that sent the backup request to peer backup handler 572. Peer backup handler 572 may initiate peer storage manager 574 to store the received configuration data.

Peer storage manager 574 may include data structures, functions, parameters, and/or interfaces for storing, reading, and otherwise managing peer configuration data. For example, peer storage manager 574 may receive peer configuration data from peer backup handler 572 and store it to peer data 520.2 in non-volatile memory 520. In some embodiments, peer storage manager 574 may use a device registry, such as device registry 562.1, to manage peer configuration data. For example, peer storage manager 574 may write or update the device registry entry corresponding to device identifiers 574.1 of the source device with peer device configuration data 574.2 and/or a storage location in peer data 520.2 where the configuration data is stored. When a recall request is received by peer recall handler 576, peer storage manager 574 may use the device identifier of the requesting device as an index value to retrieve device configuration data 574.2 from device registry 562.1 and/or the storage location in peer data 520.2 where the configuration data is stored. The configuration data read by peer storage manager 574 may be returned to peer recall handler 576 and/or messaging service 566 for return to the requesting peer device.

Peer recall handler 576 may include data structures, functions, parameters, and/or interfaces for receiving and fulfilling recall requests from connected devices that have previously backed up their configuration data with storage device 500. For example, peer recall handler 576 may receive a peer recall request received by messaging service 566, use peer storage manager 574 to retrieve the requested configuration data, and initiate messaging service 566 to return the configuration data to the requesting peer device. Messaging service 566 may send the recall request, including a device identifier for the requesting device, to peer recall handler 576 and peer recall handler 576 may initiate peer storage manager 574 to use the device identifier to locate and return the requested configuration data. Responsive to receiving the previously stored configuration data from peer storage manager 574, peer recall handler 576 may instruct messaging service 566 to return the configuration data in the response message to the recall request.

Figure 6:
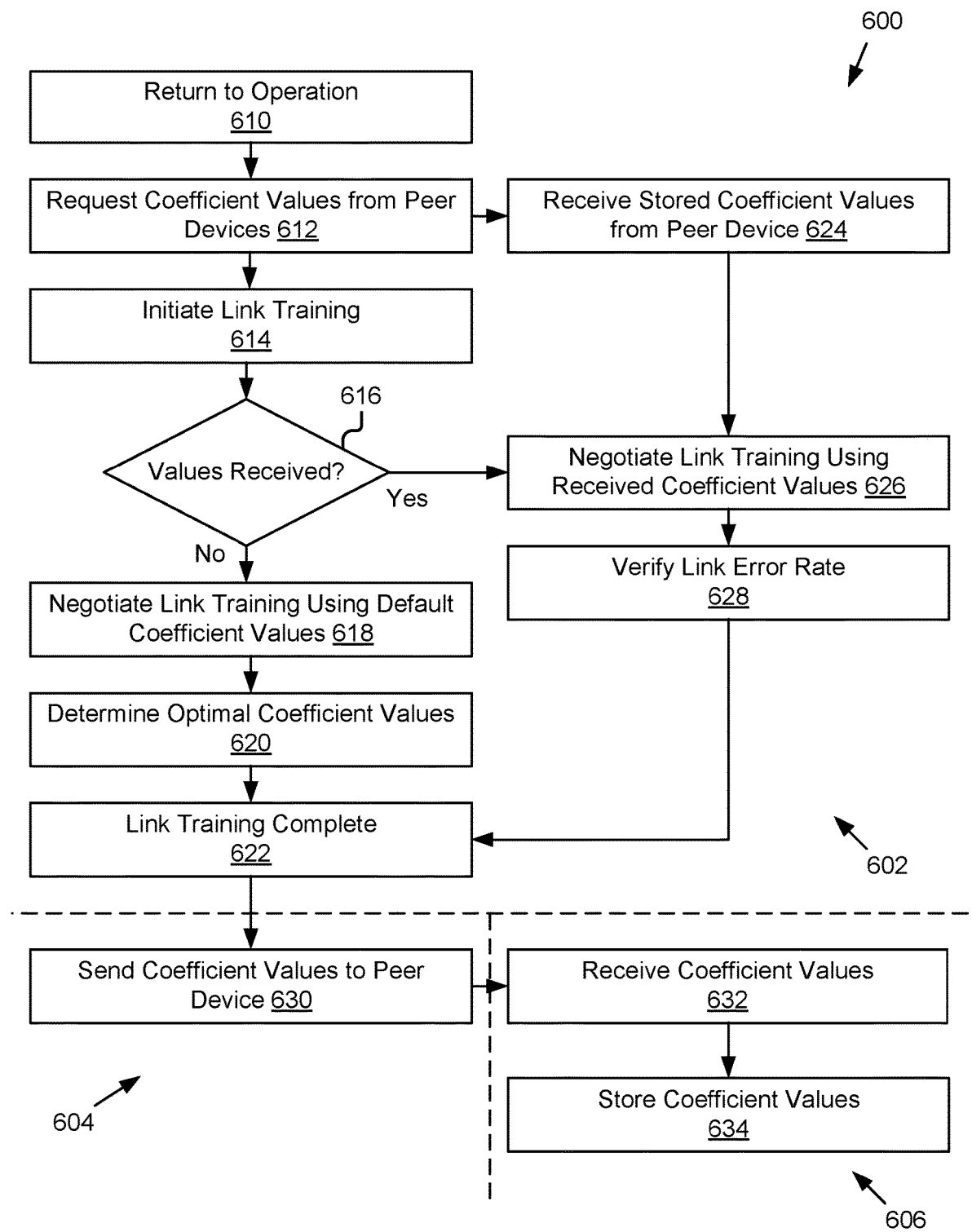
FIG. 6 is a flowchart of an example method of using stored coefficient values to accelerate link training.

As shown in FIG. 6, storage device 500 may be operated according to an example method for using stored coefficient values to accelerate link training, i.e., according to method 600 illustrated by blocks 610-634 in FIG. 6. The blocks indicated by 602 illustrate the use of received coefficient values to accelerate link training. The block indicated by 604 illustrates the backup of the trained coefficient values to a peer device over the control bus and the block indicated by 606 illustrate the peer device receiving and storing the coefficient values to be returned for a future operation of method 600.

At block 610, the connected device returns to operation. For example, a connected device may bootup after a prior operating period and shut down where coefficient values were previously determined but lost due to the shutdown.

At block 612, coefficient values may be requested from peer devices. For example, where the connected device has previously stored coefficient values to another connected device, the device may request recall of the coefficient values using the control bus messaging.

At block 614, link training is initiated. For example, as part of a cold boot or power state change, a link state machine may monitor return of a peripheral interface's physical and data links, which may include physical link training and negotiation between the connected device and an upstream system.

At block 616, whether previously stored coefficient values are received may be determined. For example, the link state machine may include coefficient value logic for checking whether previously stored coefficient values are available from a memory location or internal call. If no previously stored coefficient values are received, method 600 may continue to block 618 for standard link negotiation. If previously stored coefficients are received, method 600 may proceed to block 626 to attempt to use the received coefficient values to accelerate link training.

At block 618, link training may be negotiated using default coefficient values. For example, the connected device may select a default set of preset coefficient values to initiate negotiation, send them to the upstream system through the peripheral interface, and check the resulting bit error rate.

At block 620, optimal coefficient values may be determined. For example, the coefficient value logic may iterate through failing sets of coefficient values until the desired bit error threshold is achieved and those coefficient values are selected as optimal for this link.

At block 622, link training may be complete. For example, the optima coefficient values may enable a target data rate meeting the desired bit error threshold and establish physical and data link to support application-level communication over the peripheral interface.

At block 624, stored coefficient values may be received from a peer device. For example, another connected device that previously stored a set of optimal coefficient values for the requesting device may return the stored coefficient values using control bus messaging.

At block 626, link training may be negotiated using the received coefficient values. For example, the device may provide the received coefficient values to the coefficient value logic of the link state machine for use in link training and the received coefficient values may be used as the initial values for negotiation.

At block 628, link error rate may be verified. For example, after the received coefficient values are sent to the upstream device, the downstream device may check the bit error rate of a test data sequence sent using those coefficients to verify that a desired bit error threshold is met. If so, link training (or at least a phase of link training) may be complete at block 622. If not, method 600 may proceed to block 620 and iterate through coefficient values using the standard link negotiation process.

At block 630, coefficient values may be sent to one or more peer devices. For example, based on successful link training and establishing application-level communication over the peripheral interface, the device may initiate backup of the current optimal coefficient values for future use in method 600 and send the optimal coefficient values to one or more connected devices using control bus messaging.

At block 632, one or more peer devices may receive the coefficient values. For example, each connected device to which the optimal coefficient values are sent, may receive a configuration data backup request in one or more control bus messages.

At block 634, one or more peer devices may store the coefficient values. For example, each connected device that receives the configuration data backup request may store the coefficient values associated with the device identifier for the sending device and return those stored coefficient values when a recall request message is received to support block 624 in future iterations through method 600.

Figure 7:
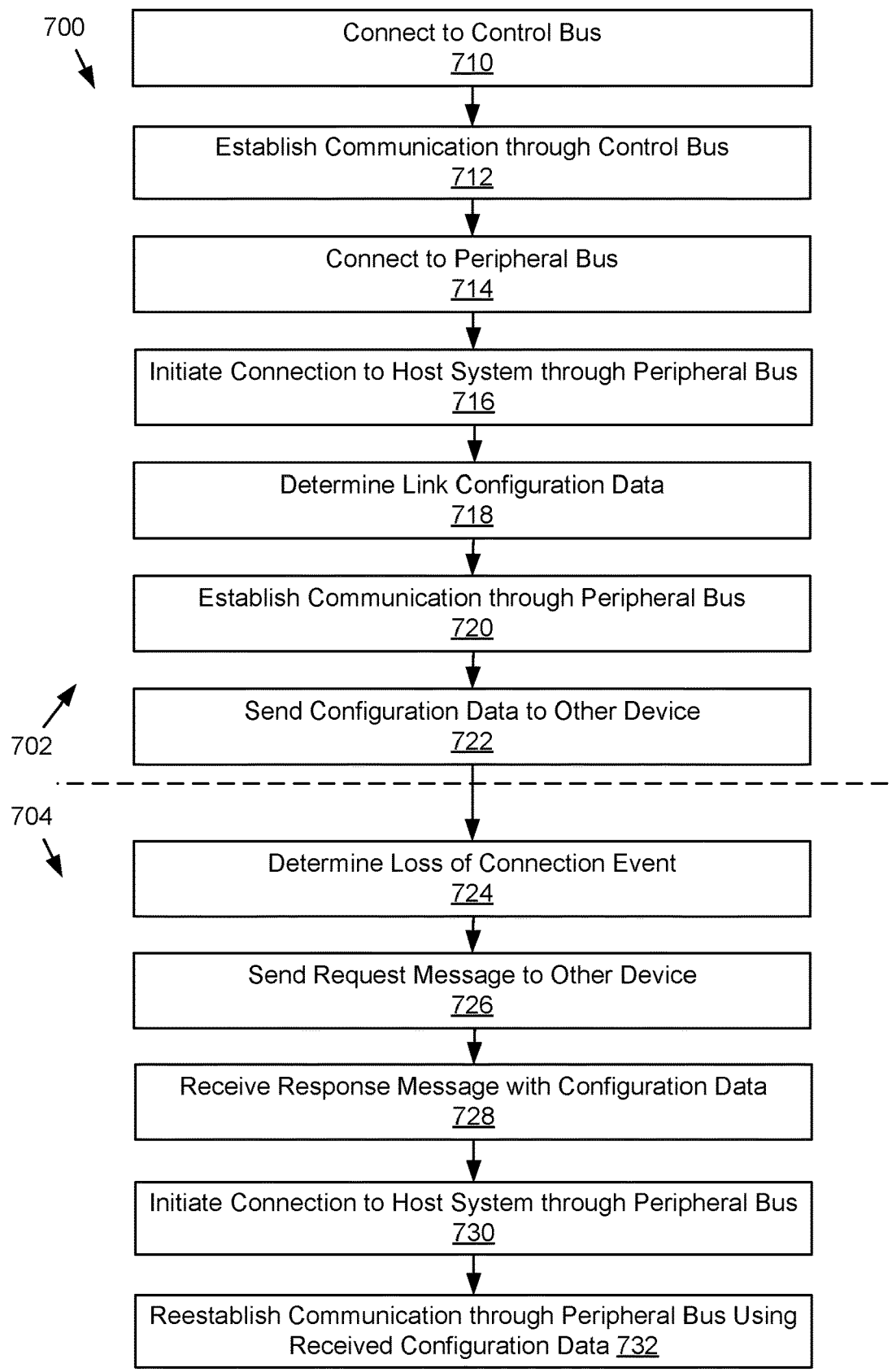
FIG. 7 is a flowchart of an example method of using stored configuration data to accelerate link training.

As shown in FIG. 7, storage device 500 may be operated according to an example method for using stored configuration data to accelerate link training, i.e., according to method 700 illustrated by blocks 710-732 in FIG. 7. Method 700 may be implemented across a first operating period 702 followed by a second operating period 704, generally separated by at least one loss of connection event. First operating period 702 may be an initial operating period after initialization of the device, in which a reliable physical and data link is established over the peripheral interface prior to second operating period At block 710, a device is connected to a control bus. For example, a data storage device may be physically and electrically connected through a control bus interface to a control bus.

At block 712, communication through the control bus may be established. For example, the data storage device may use a control bus protocol to establish communication with one or more connected devices through the control bus.

At block 714, the device is connected to a peripheral bus. For example, the data storage device may be physically and electrically connected through a storage bus interface to a peripheral interface bus.

At block 716, connection to a host system may be initiated through the peripheral interface bus. For example, a link state machine according to the peripheral interface protocol may initiate electrical connection and proceed through various states in an attempt to establish application-level communication over the peripheral interface bus.

At block 718, link configuration data may be determined. For example, the link state machine may negotiate link training between the data storage device and the host system to determine various configuration parameters, including coefficient values for optimizing the physical and data link across the peripheral interface bus.

At block 720, communication may be established through the peripheral interface bus. For example, the state machine may achieve a desired link state having a target data rate and meeting a desired bit error rate threshold to support reliable data, transaction, and application-level communication across the peripheral interface bus.

At block 722, configuration data may be sent to other devices. For example, the data storage device may be in communication with other connected devices over the control bus and use control bus messaging to backup the configuration data, such as a set of optimal coefficient values, to one or more of those connected devices.

At block 724, following a loss of connection event, the loss of connection event is determined. For example, the data storage device may determine that it is returning to normal operation from a cold boot, power cycle, power state change, or other interface error or interruption and expect link training for the peripheral interface to be necessary for return to normal operations.

At block 726, a request message may be sent to at least one other connected device. For example, the data storage device may send a recall request message to one or more peer data storage devices, a host BIOS, and/or a BMC through the control bus prior to recovery of the peripheral interface and initiation of link training.

At block 728, a response message including the configuration data may be received. For example, the data storage device may receive a response message over the control bus from the one or more connected devices with the configuration data in the response message payload.

At block 730, connection to the host system may be initiated through the peripheral bus. For example, the link state machine may initialize a connection process as described above for block 716, but may now use the received configuration data, such as previously stored optimal coefficient values, to initiate link training negotiation.

At block 732, communication may be reestablished through the peripheral interface bus using the received configuration data. For example, use of the received configuration data may accelerate the link negotiation phase and allow the data storage device to more quickly reestablish physical and data link to support transaction and application-level communications.

Figure 8:
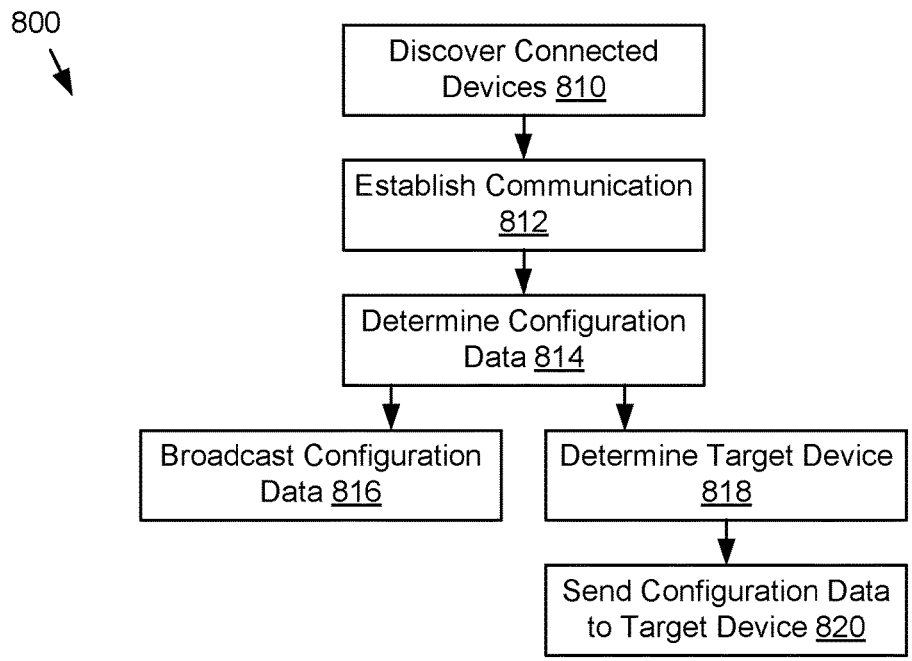
FIG. 8 is a flowchart of an example method of storing configuration data to connected devices over a control bus.

As shown in FIG. 8, storage device 500 may be operated according to an example method for storing configuration data to connected devices over a control bus, i.e., according to method 800 illustrated by blocks 810-820 in FIG. 8.

At block 810, connected devices may be discovered. For example, a control bus protocol may define a discovery process for devices connected to a control bus and the discovery process may be used to determine the other connected devices on the control bus and their respective device identifiers and control bus addresses.

At block 812, communication may be established over the control bus. For example, based on the discovered connected devices, the device may use a messaging protocol for direct messaging and/or broadcast messaging over the control bus.

At block 814, configuration data may be determined. For example, the device may determine configuration data for another interface, such as a high-throughput peripheral interface, that includes optimal parameters for reestablishing application-level communication through the peripheral interface.

At block 816, the configuration data may be broadcast to the connected devices. For example, the device may broadcast a backup message with the configuration data as payload to all connected devices on the control bus.

At block 818, a target connected device may be determined. For example, the device may select one or more connected devices to receive the configuration data via a direct message over the control bus.

At block 820, the configuration data may be sent to the target connected device. For example, the device may send a backup message with the configuration data as payload to one or more target connected devices.

Figure 9:
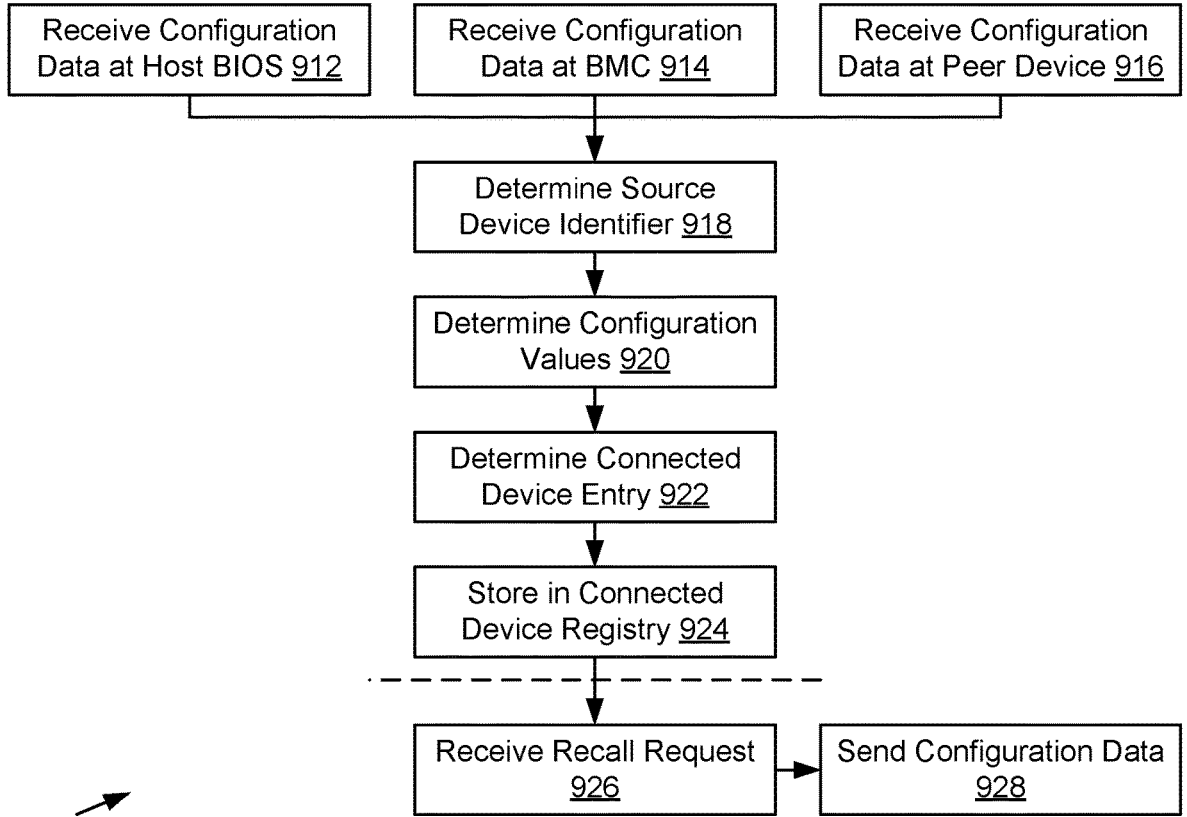
FIG. 9 is a flowchart of an example method of receiving and returning configuration data over a control bus as a connected device.

As shown in FIG. 9, storage device 500 may be operated according to an example method for receiving and returning configuration data over a control bus as a connected device, i.e., according to method 900 illustrated by blocks 912-928 in FIG. 9. Blocks 912-916 illustrate example connected devices that may provide configuration data backup over the control bus in various embodiments.

At block 912, configuration data may be received at a host BIOS. For example, a host system may include a BIOS that interfaces with the control bus for power and component management and is available early in a boot process, prior to establishing communication through a peripheral interface, to receive and send configuration data for other connected devices.

At block 914, configuration data may be received at a BMC. For example, a BMC may interface with the control bus for power and component management and may be available early in a boot process and/or independent of power states of other connected devices to receive and send configuration data for other connected devices.

At block 916, configuration data may be received at a peer device. For example, a plurality of peer devices may be connected to the control bus and may be available early in a boot process and/or operate in different power states from the device backing up configuration data to receive and send configuration data for the device backing up configuration data.

At block 918, a source device identifier may be determined. For example, a backup request message received at blocks 912-916 may include a source device identifier for the device backing up configuration data, such as in header data for the message, which may be parsed by the receiving device.

At block 920, configuration data values may be determined. For example, the backup request message received at blocks 912-916 may include configuration data in the payload and the receiving device may parse the payload data to determine configuration data values, such as a set of coefficient values.

At block 922, a connected device entry may be determined. For example, based on the source device identifier, the receiving device may determine a connected device entry in a connected device registry in the receiving device.

At block 924, the configuration data may be stored in the connected device registry. For example, the receiving device may add the configuration data values to the connected device entry determined at block 922 and/or add/update a pointer in the connected device entry to a storage location for the configuration data in a local memory of the receiving device.

At block 926, following a loss of connection event for the source device, a recall request may be received. For example, the receiving device may receive a recall request message over the control bus specifying the source device identifier and configuration data to be recalled.

At block 928, the configuration data may be sent back to the source device. For example, the receiving device may use the connected device entry for the source device identifier to determine the previously stored configuration data and send it in the payload of a response message to the recall request message over the control bus.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first data storage device comprising:
  a peripheral interface configured to connect to a host system through a peripheral interface bus using a peripheral interface protocol, wherein the first data storage device is configured to receive storage communication through the peripheral interface;
  a control bus interface configured to connect to a control bus using a control bus protocol, wherein at least a second device is configured to connect to the control bus using the control bus protocol;
  a control bus messaging service configured to establish control bus communication between the first data storage device and the second device over the control bus and using the control bus protocol, wherein the first data storage device is configured to, during data storage device initialization, establish control bus communication with the second device prior to establishing storage communication through the peripheral interface;
  a configuration service configured to, responsive to a loss of connection event for the peripheral interface, receive, through the control bus interface and from the second device, configuration data for the peripheral interface protocol; and
  a link state machine configured to reestablish, using the configuration data received from the second device, communication through the peripheral interface to the host system.

2. The system of claim 1, wherein:
the control bus messaging service is further configured to:
  send, to the second device and during a first operating period, a first peer message including the configuration data; and
  send, to the second device and during a second operating period, a second peer message to request the configuration data;
the configuration service is further configured to determine, based on establishing communication through the peripheral interface to the host system during the first operating period, the configuration data;
the second operating period is after the first operating period and responsive to the loss of connection event; and
reestablishing communication through the peripheral interface is during the second operating period.

3. The system of claim 2, wherein the loss of connection event for the peripheral interface is selected from:
a power cycling event;
a cold boot event;
a reboot event;
a reset event;
a power state change event; and
a link error event.

4. The system of claim 1, wherein:
the control bus messaging service is further configured to:
  establish communication with a plurality of connected devices including the second device; and
  broadcast, to the plurality of connected devices, a first peer message including the configuration data; and
each connected device of the plurality of connected devices is configured to store the configuration data.

5. The system of claim 4, wherein:
the first data storage device and each connected device of the plurality of connected devices are configured to store a connected device registry;
each connected device registry includes connected device entries corresponding to each other device of the plurality of connected devices and the first data storage device; and
each connected device entry includes:
  a connected device identifier; and
  corresponding configuration data.

6. The system of claim 1, wherein:
the configuration data comprises a set of coefficient values for physical link training; and
the link state machine is further configured to negotiate, using the configuration data, physical link training between the first data storage device and the host system according to the peripheral interface protocol to reestablish communication through the peripheral interface.

7. The system of claim 6, wherein the set of coefficient values comprises coefficient presets for physical link filter values selected from a plurality of coefficient presets defined by the peripheral interface protocol.

8. The system of claim 1, further comprising:
a plurality of data storage devices configured for:
  storage communication with the host system through the peripheral interface bus using the peripheral interface protocol; and
  peer data storage device communication with each other data storage device of the plurality of data storage devices through the control bus using the control bus protocol, wherein:
    the plurality of data storage devices includes the first data storage device; and
    the second device is a second data storage device of the plurality of data storage devices.

9. The system of claim 1, wherein the second device is selected from:
the host system comprising:
  a host control bus interface configured for control bus communication with the first data storage device through the control bus using the control bus protocol; and
  a basic input output system configured to store the configuration data from a prior operating period for the first data storage device; and
a baseboard management controller comprising:
  a management control bus interface configured for control bus communication with the first data storage device through the control bus using the control bus protocol; and a management memory configured to store the configuration data from a prior operating period for the first data storage device.

10. The system of claim 1, further comprising:
a plurality of data storage devices configured for:
   storage communication with the host system through the peripheral interface bus using the peripheral interface protocol; and
   control bus communication with the host system through the control bus using the control bus protocol, wherein, during data storage device initialization, control bus communication is established prior to storage communication; and
the host system comprising:
   a host control bus interface configured for control bus communication with the plurality of data storage devices through the control bus using the control bus protocol; and
   a memory configured to store, for each data storage device of the plurality of data storage devices, configuration data from a prior operating period for that data storage device, wherein:
      the plurality of data storage devices includes the first data storage device; and
      the second device is the host system.

11. A method, comprising:
establishing, by a first data storage device, control bus communication between the first data storage device and a second device over a control bus and using a control bus protocol;
initiating, by the first data storage device, storage communication between the first data storage device and a host system through a peripheral interface to a peripheral interface bus and using a peripheral interface protocol, wherein, during data storage device initialization, the first data storage device establishes control bus communication with the second device prior to establishing storage communication with the host system;
receiving, by the first data storage device and responsive to a loss of connection event for the peripheral interface, configuration data for the peripheral interface protocol from the second device over the control bus; and
reestablishing, by the first data storage device and using the configuration data received from the second device, storage communication through the peripheral interface to the host system.

12. The method of claim 11, further comprising:
determining, by the first data storage device and based on establishing storage communication through the peripheral interface to the host system during a first operating period, the configuration data;
establishing, by the first data storage device, communication with the second device over the control bus during the first operating period;
sending, from the first data storage device to the second device and during the first operating period, a first peer message including the configuration data; and
sending, from the first data storage device to the second device and during a second operating period, a second peer message to request the configuration data, wherein:
   the second operating period is after the first operating period and responsive to the loss of connection event; and
   reestablishing communication through the peripheral interface is during the second operating period.

13. The method of claim 12, further comprising:
determining, by the first data storage device, the loss of connection event for the peripheral interface, wherein the loss of connection event is selected from:
   a power cycling event;
   a cold boot event;
   a reboot event;
   a reset event;
   a power state change event; and
   a link error event.

14. The method of claim 11, further comprising:
establishing, by the first data storage device, control bus communication with a plurality of connected devices including the second device;
broadcasting, by the first data storage device and to the plurality of connected devices, a first peer message including the configuration data; and
storing, by each connected device of the plurality of connected devices, the configuration data.

15. The method of claim 14, further comprising:
storing, by the first data storage device and each connected device of the plurality of connected devices, a connected device registry, wherein:
each connected device registry includes connected device entries corresponding to each other device of the plurality of connected devices and the first data storage device; and
each connected device entry includes:
   a connected device identifier; and
   corresponding configuration data.

16. The method of claim 11, further comprising:
negotiating, by the first data storage device and using the configuration data, physical link training between the first data storage device and the host system according to the peripheral interface protocol to reestablish communication through the peripheral interface, wherein the configuration data comprises a set of coefficient values for physical link training.

17. The method of claim 16, wherein the set of coefficient values comprises coefficient presets for physical link filter values selected from a plurality of coefficient presets defined by the peripheral interface protocol.

18. The method of claim 11, wherein:
the first data storage device is one data storage device of a plurality of data storage devices configured for:
   peer communication though the control bus; and
   storage communication with the host system through the peripheral interface bus; and
the second device is a second data storage device of the plurality of data storage devices.

19. The method of claim 11, further comprising:
receiving, by the host system and through the control bus, the configuration data from the first data storage device during a first operating period;
storing, by the host system and in a memory of the host system, the configuration data during the first operating period; and
sending, by the host system and through the control bus, the configuration data to the first data storage device prior to reestablishing communication through the peripheral interface during a second operating period.

20. A storage system comprising a plurality of data storage devices, wherein each data storage device comprises:
at least one processor;

at least one memory;

a storage interface configured to connect to a host system through a peripheral interface bus using a peripheral interface protocol to establish storage communication for that data storage device;

a control bus interface configured to connect to a control bus for control bus communication, wherein, during data storage device initialization, that data storage device establishes control bus communication prior to establishing storage communication with the host system;

a storage medium configured to store host data for that data storage device;

means, stored in the at least one memory for execution by the at least one processor, for receiving, responsive to a loss of connection event for the storage interface of that data storage device, through the control bus interface and from another data storage device of the plurality of data storage devices, configuration data for the peripheral interface protocol; and means, stored in the at least one memory for execution by the at least one processor, for reestablishing, using the configuration data received from another data storage device of the plurality of data storage devices, storage communication through the storage interface to the host system.

* * * * *